United States Patent
Kokubo et al.

(10) Patent No.: US 6,520,149 B2
(45) Date of Patent: Feb. 18, 2003

(54) KNOCK CONTROL APPARATUS AND METHOD FOR ENGINES

(75) Inventors: Naoki Kokubo, Nukata-gun (JP); Hirohiko Yamada, Okazaki (JP); Kenji Kasashima, Nishikamo-gun (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 220 days.

(21) Appl. No.: 09/780,439

(22) Filed: Feb. 12, 2001

(65) Prior Publication Data

US 2001/0015198 A1 Aug. 23, 2001

(30) Foreign Application Priority Data

Feb. 15, 2000 (JP) ......................... 2000-036462

(51) Int. Cl.⁷ ............................. F02P 5/14; G01L 23/22; F02D 45/00
(52) U.S. Cl. ............................. 123/406.37; 123/406.12; 123/406.38; 123/406.65; 73/117.3; 701/114
(58) Field of Search .................. 123/406.37, 406.38, 123/406.12, 406.13, 406.21, 406.24, 406.6, 406.65; 73/117.3, 116, 35.08, 35.09; 701/110, 114, 111

(56) References Cited

U.S. PATENT DOCUMENTS

| | | | | |
|---|---|---|---|---|
| 4,255,965 A | * | 3/1981 | Schulz et al. | 73/35.11 |
| 4,424,706 A | * | 1/1984 | Oh | 123/406.38 |
| 4,444,042 A | * | 4/1984 | Bonitz et al. | 73/35.03 |
| 4,617,895 A | | 10/1986 | Sakakibara et al. | |
| 4,711,213 A | | 12/1987 | Sakakibara et al. | |
| 4,711,214 A | | 12/1987 | Sakakibara et al. | |
| 5,109,820 A | * | 5/1992 | Iwata et al. | 123/406.37 |
| 5,408,863 A | * | 4/1995 | Sawyers et al. | 73/35.09 |
| 6,196,054 B1 | * | 3/2001 | Okamura et al. | 73/35.08 |
| 6,408,242 B1 | * | 6/2002 | Tozzi | 701/114 |

FOREIGN PATENT DOCUMENTS

| | | |
|---|---|---|
| JP | 2-173357 | 7/1990 |
| JP | 6-2608 | 1/1994 |

* cited by examiner

*Primary Examiner*—Hieu T. Vo
(74) *Attorney, Agent, or Firm*—Nixon & Vanderhye P.C.

(57) ABSTRACT

A knock control apparatus has a knock sensor and a signal processor. The signal processor integrates a knock sensor signal and differentiates the integrated signal. The signal processor detects a period in which the differentiated signal exceeds a threshold, and detects a peak of the differentiated signal. The signal processor then calculates a ratio between the detected signal generation period and the detected peak to determine a knock when the calculated ratio is within a predetermined range. Alternatively, the signal processor detects a peak generation time and calculates a ratio between the detected signal generation period and the detected peak generation time. In this instance, the signal processor determines the knock when the calculated ratio is within a predetermined range and the detected peak generation time is less than a predetermined time reference.

11 Claims, 3 Drawing Sheets

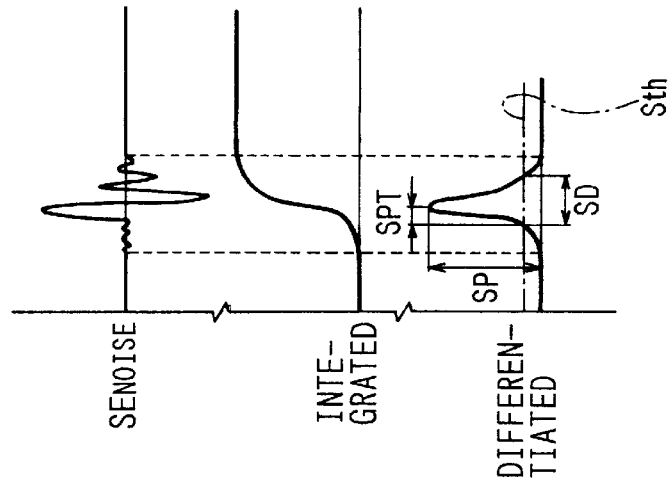
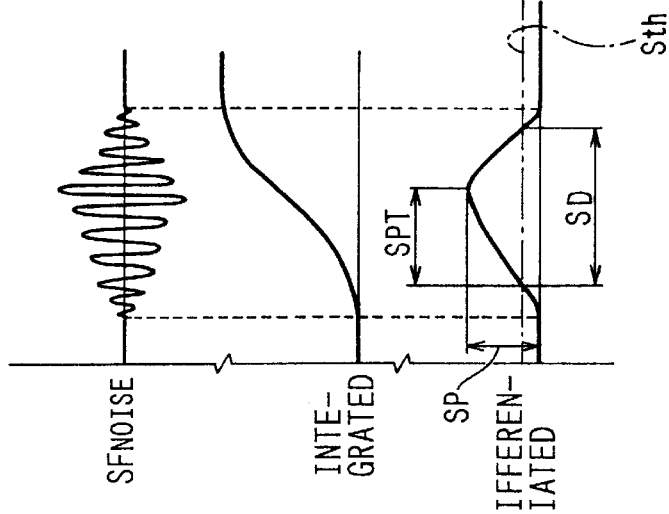
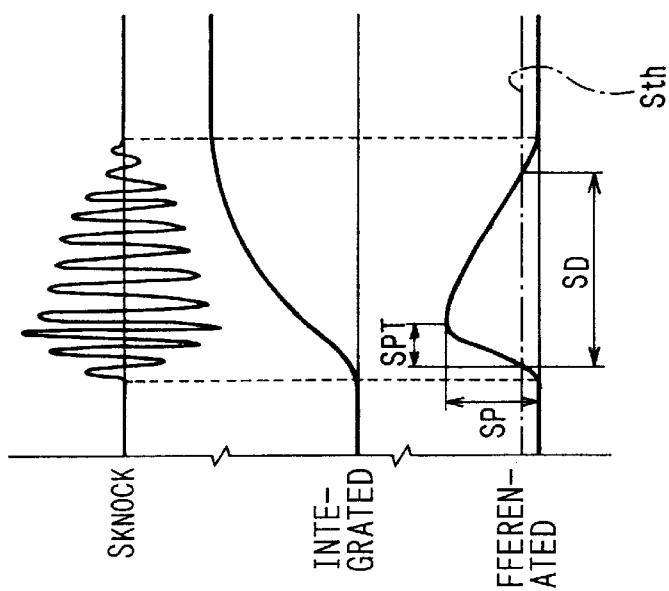

KNOCK CONTROL APPARATUS AND METHOD FOR ENGINES

CROSS REFERENCE TO RELATED APPLICATION

This application is based on and incorporates herein by reference Japanese Patent Application No. 2000-36462 filed Feb. 15, 2000.

BACKGROUND OF THE INVENTION

1. Field of the Invention

The present invention relates to a knock control apparatus and method for engines which controls engine operation based on knock determination.

2. Description of Related Art

U.S. Pat. No. 4,617,895 (JP-B2-6-60621) discloses a knock control apparatus, which checks occurrence of knock accurately by varying a reference level for knock determination so that logarithmically-transformed peak levels of the output signal of a knock sensor is in a predefined pattern of the logarithmic normal distribution.

The above apparatus subjects the output signal of the knock sensor to statistical processing to determine the logarithmic normal distribution. As a result, the reference level changes instantaneously at a transient time the engine undergoes large changes in engine operating conditions or at a time of changes in a noise level caused by turning on/off of electrical loads. If the reference level changes largely in a short time, knock cannot be detected accurately.

SUMMARY OF THE INVENTION

It is therefore an object of the present invention to provide a knock control apparatus which is capable of detecting knock accurately irrespective of large changes in engine operating conditions or in electrical loads.

According to the present invention, a knock sensor is mounted on an engine to produce a sensor signal varying its magnitude and frequency in correspondence with vibrations of the engine. A signal processor detects a signal generation period in which the sensor signal exceeds a predetermined threshold, and also a peak-related parameter of the sensor signal within the signal generation period. The peak-related parameter is either a peak of the sensor signal and a time of generation of the peak. The signal processor calculates a ratio between the peak-related parameter and the signal generation period, and determines a knock when the calculated ratio is within a predetermined range. The determination result is used to control the engine.

BRIEF DESCRIPTION OF THE DRAWINGS

The above and other objects, features and advantages of the present invention will become more apparent from the following detailed description made with reference to the accompanying drawings. In the drawings:

FIGS. 2A, 2B and 2C are waveform diagrams showing various signals applied to a digital signal processor used in the embodiment;

DETAILED DESCRIPTION OF THE PREFERRED EMBODIMENT

Figure 1:
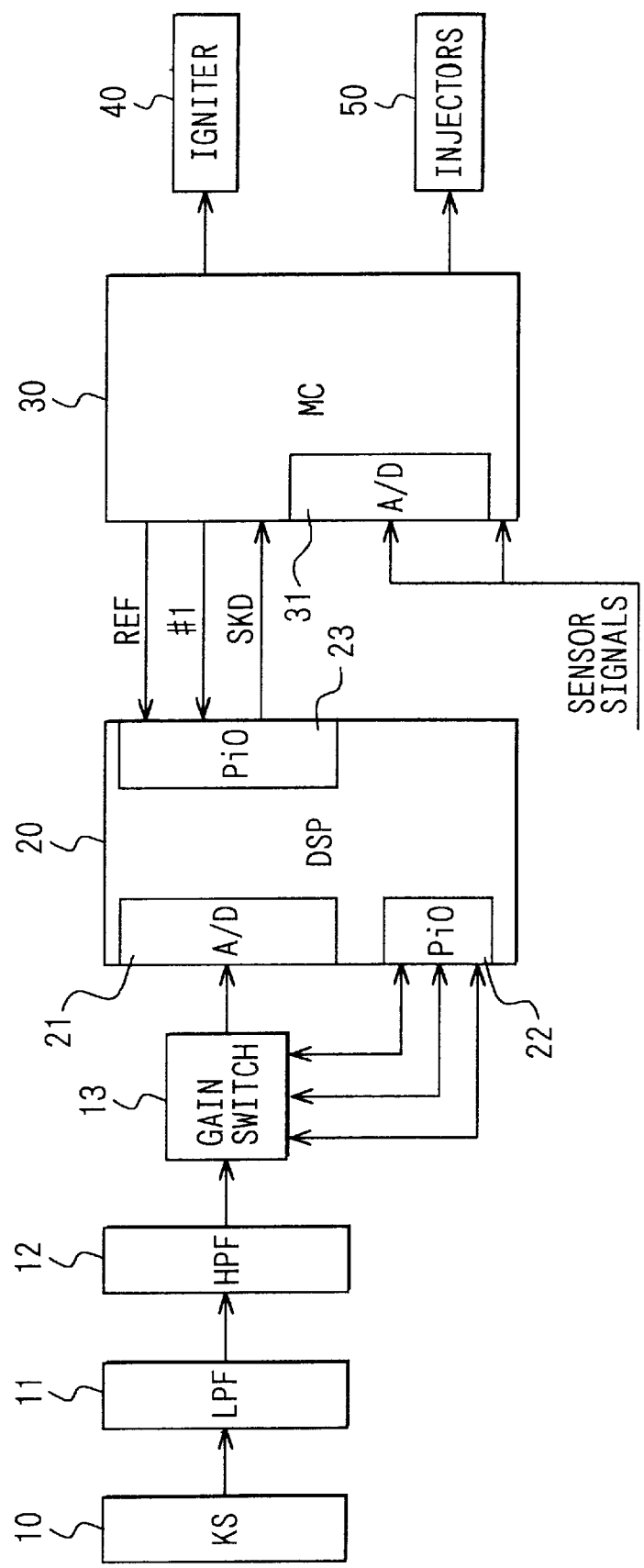
FIG. 1 is a block diagram showing a knock control apparatus for engines according to an embodiment of the present invention.

Referring first to FIG. 1, a knock control apparatus has a knock sensor (KS) 10 mounted on an internal combustion engine (not shown) for generating a knock signal SKNOCK corresponding to vibrations of the engine. The knock sensor 10 is a non-resonant type so that the vibrations are detected over a wide frequency band. The knock sensor 10 is connected to a gain switching circuit 13 through a low pass filter (LPF) 11 and a high pass filter (HPF) 12. The LPF 11 removes noise frequency components of more than 20 KHz, and the HPF 12 removes noise frequency components of less than 1 KHz. Thus, the input signal produced from the HPF 12 has only signal components which primarily correspond to frequencies of knocks of the engine. The gain switching circuit 13 has a wide dynamic range corresponding to that of a 16-bit A/D converter and regulates the input signal to appropriate amplitudes.

The gain switching circuit 13 is connected to a digital signal processor (DSP) 20, which is capable of multiplication-processing the signal from the gain switching circuit 13 at high speeds. The DSP 20 has an analog/digital (A/D) converter 21 and parallel input/output circuits (PiO) 22 and 23. The DSP 20 thus controls the gain of the gain switching circuit 13 by its gain switching signals produced from the PiO 22.

The DSP 20 is connected to a microcomputer (MC) 30 for communicating with the same through the PiO 23. Specifically, the DSP 20 receives, from the MC 30, a reference position signal (REF) when an engine crankshaft rotates to a predetermined angular position, and also a first cylinder detection signal (#1). The DSP 20 applies a knock determination signal (SKD) indicative of occurrence of knock to the MC 30. Cylinders other than the first cylinder are detected by counting the crankshaft rotation by a counter.

The MC 30 receives various sensor signals from a crankshaft angle sensor, intake air sensor, coolant temperature sensor and the like. Some sensor signals which are in digital form are applied directly to the MC 30, while other sensor signals which are in analog form are applied to an A/D converter 31 of the MC 30 to be converted into the digital form. The MC 30 calculates ignition time point and fuel injection amount based on those sensor signals, and drives an igniter 40 and injectors 50. In addition, the MC 30 corrects the ignition time point based on the knock determination signal SKD applied from the DSP 20 to suppress knocks.

The MC 30 is constructed as a logic arithmetic circuit, which includes a central processing unit (CPU) for executing various calculations, a read-only memory (ROM), a random access memory (RAM) for storing various data, a backup RAM, an input/output circuit, a bus connecting those circuits, etc.

The output signal of the knock sensor 10 includes various vibration signal components. FIGS. 2A, 2B and 2C show, respectively, three signal patterns, that is, knock signal SKNOCK, mechanical friction noise signal SFNOISE and electrical noise signal SENOISE, which are derived from the knock sensor output signal when the positive side signal components of the knock signal SKNOCK are integrated and the integrated signal is differentiated by the DSP 20. In FIGS. 2A, 2B and 2C, Sth indicates a predetermined threshold level Sth, which is set not for checking for occurrence of knock but for determining a signal generation period SD for signal processing in the DSP 20. SP indicates a peak of the signal, and SPT indicates a peak time at which the peak SP appears after the start of the signal generation period SD.

The knock signal SKNOCK is generated as shown in FIG. 2A due to self-ignition of fuel within each engine cylinder. The knock signal SKNOCK has such a characteristics that it increases at the initial stage and then gradually attenuates due to resonance of pressure within the engine cylinder. That is, in the case of the knock signal SKNOCK, a large peak SP appears at an early time SPT in a relatively long signal generation period SD as understood from the differentiated signal pattern.

The mechanical friction noise signal SFNOISE is generated as shown in FIG. 2B due to friction between individual parts of the engine. As the friction pressure gradually increases and gradually decreases in a rotary body, the friction noise signal SFNOISE changes similarly. That is, in the case of the friction noise signal SFNOISE, a small peak SP appears at an intermediate time SPT in a relatively long signal generation period SD as understood from the differentiated signal pattern.

The electrical noise signal SENOISE is generated temporarily as shown in FIG. 2C due to turning on or off of the electrical loads. As a result, the electrical noise signal has such a characteristics that it sharply rises and sharply falls. That is, in the case of the electrical noise signal SENOISE, a large peak SP appears at an early time SPT in a short signal generation period SD as understood from the differentiated signal pattern. This electrical noise signal has a similar signal pattern as that of a mechanical noise signal corresponding to hitting sound.

Figure 3:
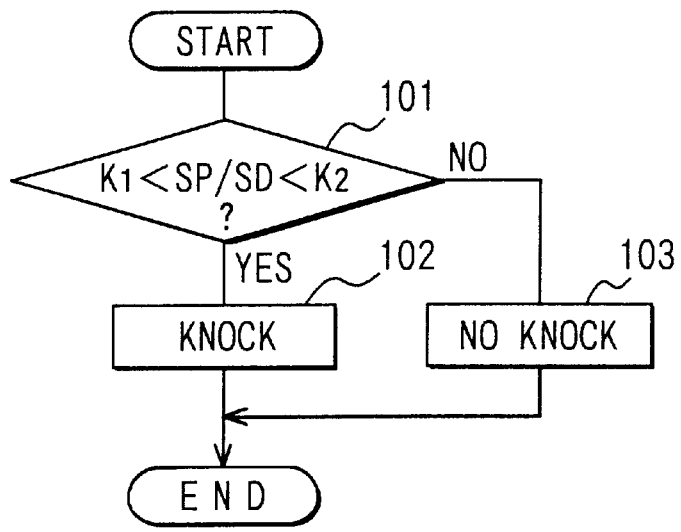
FIG. 3 is a flow diagram showing knock check processing executed by the digital signal processor.

The DSP 20 is programmed to execute knock check processing as shown in FIG. 3 thereby to produce the knock determination signal. This processing is repeated for each combustion cycle of the engine indicated by the reference position signal REF and the first cylinder signal #1 applied from the MC 30.

In FIG. 3, it is assumed that the DSP 20 detects a peak level SP and a signal generation period SD of the signal derived as above from the knock signal of the knock sensor 10, and calculates a ratio (SP/SD) between the peak level SP and the period SD. It is to be noted that the calculated ratio SP/SD will be large, medium and small in the case of signal patterns of FIG. 2C (electrical noise), 2A (knock) and 2B (mechanical friction noise). DSP 20 compares, at step 101, the calculated ratio SP/SD with lower and upper references K1 and K2. The references K1 and K2 are set for checking which pattern of FIGS. 2A, 2B and 2C the subject signal has.

If the comparison result is YES (K1<SP/SD<K2), the signal pattern is determined to correspond to the knock pattern of FIG. 2A. The DSP 20 thus determines occurrence of knock at step 102 and sets a knock flag to "1". If the comparison result is NO, the signal pattern is determined to correspond to either pattern of FIG. 2B or FIG. 2C, which indicate the mechanical friction noise pattern or electrical noise pattern, respectively. The DSP 20 thus determines no occurrence of knock at step 103 and resets the knock flag to "0".

The knock determination signal SKD becomes high and low in response to the knock flag "1" and "0", respectively. It is known in the art that MC 30 corrects the ignition time point to advanced time point and retarded time point in response to high level and the low level of the knock determination signal SKD.

Figure 4:
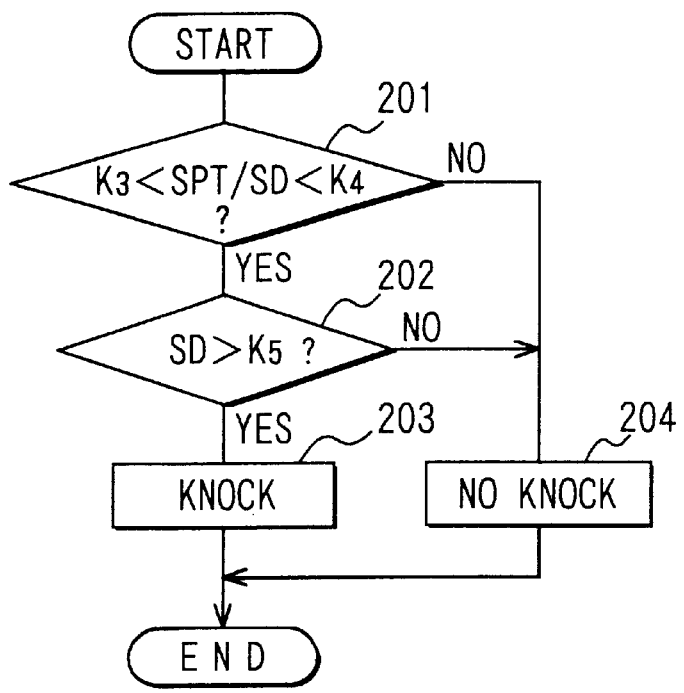
FIG. 4 is a flow diagram showing a modification of the knock check processing executed by the digital signal processor.

Alternative to FIG. 3, the DSP 20 may be programmed to execute processing as shown in FIG.4. It is assumed that the DSP 20 detects a peak appearance time SPT and a signal generation period SD of the signal derived as above from the knock signal of the knock sensor 10, and calculates a ratio (SPT/SD) between the peak appearance time SPT and the period SD.

The DSP 20 compares, at step 201, the calculated ratio SP/SD with lower and upper references K3 and K4. The references K3 and K4 are set for checking which pattern of FIGS. 2A, 2B and 2C the subject signal has.

If the comparison result is YES (K3<SPT/SD<K4), the DSP 20 further checks, at step 202, whether the signal generation period SD is longer than a predetermined reference K5. If the comparison result at step 202 is also YES, the DSP 20 determines that the signal pattern corresponds to the pattern of FIG. 2A. Thus, the DSP 20 determines occurrence of knock at step 203 and sets the knock flag to "1".

If the comparison results at steps 201 or 202 is NO, the signal pattern is determined to correspond to either pattern of FIG. 2B or FIG. 2C, which indicate the mechanical friction noise pattern or electrical noise pattern, respectively. The DSP 20 thus determines no occurrence of knock at step 204 and resets the knock flag to "0". It is to be noted that, if SPT/SD>K4 (NO at step 201), the peak appearance time SPT is long as shown in FIG. 2B (mechanical friction noise). Further, if SPT/SD<K3 (NO at step 201) or SD<K5 (NO at step 202) with K3<SPT/SD<K4 (YES at step 201), the peak appearance time SPT is very short or the signal generation period SD is short as shown in FIG. 2C (electrical noise).

In the above embodiment and modification, the occurrence of knock may be determined by differentiating the negative side signal component of the knock signal SKNOCK. The knock sensor 10 my be a cylinder-pressure sensor which is capable of detecting pressure in the engine cylinder, or a ion-current sensor which is capable of detecting ion-current flowing through a discharge gap of an ignition spark plug.

The present invention may further be implemented in other ways without departing from the spirit of the invention.

What is claimed is:

1. A knock control apparatus for engines comprising:

sensor means for detecting vibrations of an engine and producing a sensor output signal corresponding to the detected vibration;

period detecting means for detecting a signal generation period in which the sensor output signal exceeds a predetermined threshold;

parameter detecting means for detecting a peak-related parameter of the sensor output signal in the signal generation period, the peak-related parameter being indicative of at least one of a peak of the sensor output signal and a time of generation of the peak;

knock determination means for determining a knock based on a relation between the signal generation period and the peak-related parameter; and knock control means for controlling engine operation in response to a determination of the knock determination means.

2. The knock control apparatus as in claim 1, wherein:

the parameter detecting means detects the peak of the sensor output signal; and the knock determination means determines the knock when a ratio between the signal generation period and the peak is within a predetermined range.

3. The knock control apparatus as in claim 1, wherein:

the parameter detecting means detects the time of generation of the peak.

4. The knock control apparatus as in claim 3, wherein:

the knock determination means determines the knock when the peak generation time is within a predetermined range relative to the signal generation period.

5. The knock control apparatus as in claim 1, wherein:

the sensor means produces the sensor output signal which primarily includes frequencies specific to the knock.

6. A knock control method for engines comprising the steps of:

producing a sensor signal from a sensor mounted on an engine, the signal varying its magnitude and frequency in correspondence with vibrations of the engine;

detecting a signal generation period in which the sensor signal exceeds a predetermined threshold;

detecting a peak-related parameter of the sensor signal within the signal generation period, the peak-related parameter being at least one of a peak of the sensor signal and a time of generation of the peak;

calculating a ratio between the peak-related parameter and the signal generation period;

determining a knock when the calculated ratio is within a predetermined range; and controlling the engine in response to a determination result of the determining step.

7. The knock control method as in claim 6, further comprising the steps of:

integrating the sensor signal; and differentiating the integrated signal, wherein the signal generation period and the peak-related parameter are detected based on the differentiated signal.

8. The knock control method as in claim 7, wherein:

the peak-related parameter detecting step detects a peak of the differentiated signal in the signal generation period; and the ratio calculating step calculates the ratio between the detected peak and the signal generation period.

9. The knock control method as in claim 7, wherein:

the peak-related parameter detecting step detects a time of generation of the peak of the differentiated signal in the signal generation period; and the ratio calculating step calculates the ratio between the detected time of generation of the peak.

10. The knock control method as in claim 9, wherein:

the determining step determines the knock when the detected time of generation of the peak is less than a predetermined time reference in addition to the calculated ratio being within the predetermined range.

11. The knock control method as in claim 6, wherein:

the peak-related parameter detecting step detects both the peak of the sensor signal and the time of generation of the peak of the sensor signal;

the calculating step calculates the ratio between the detected time of generation of the peak an d the signal generation period; and the determining step determines the knock when the detected time of generation of the peak is less than a predetermined time reference in addition to the calculated ratio being within the predetermined range.

\* \* \* \* \*